United States Patent [19]

Dodds

[11] Patent Number: 4,824,513

[45] Date of Patent: * Apr. 25, 1989

[54] SILICONE RUBBER VACUUM BAG TOOL

[75] Inventor: John J. Dodds, Clifton Heights, Pa.

[73] Assignee: The Boeing Company, Seattle, Wash.

[*] Notice: The portion of the term of this patent subsequent to Oct. 6, 2004 has been disclaimed.

[21] Appl. No.: 87,327

[22] Filed: Aug. 20, 1987

Related U.S. Application Data

[63] Continuation of Ser. No. 655,656, Sep. 28, 1984, Pat. No. 4,698,115.

[51] Int. Cl.$^4$ .................. B25B 11/00; B32B 33/00
[52] U.S. Cl. ........................... 156/382; 269/21
[58] Field of Search ................. 156/285–287, 156/381–382; 428/447; 269/21; 279/3

[56] References Cited

U.S. PATENT DOCUMENTS

| | | | |
|---|---|---|---|
| 3,666,600 | 5/1972 | Yoshino | 156/382 |
| 4,078,962 | 3/1978 | Krueger | 156/286 |
| 4,698,115 | 10/1987 | Dodds | 156/382 |

Primary Examiner—Merrell C. Cashion, Jr.
Attorney, Agent, or Firm—Jones, Tullar & Cooper

[57] ABSTRACT

A vacuum bag tool utilizing a silicone rubber sheet as the bag. The silicone rubber sheet has at least one edge and a strip of silicone elastomer material adhered by curing to a surface of the sheet along each edge. On each strip of silicone elastomer material a further strip of adhesive tape is adhered. With this adhesive tape, the bag is adhered to the base plate of the tool. Thereafter, a vacuum can be established within the bag adhered to the base plate. The tool can thus be used for applying pressure to a layup of composite material place on the base plate and within the bag.

2 Claims, 2 Drawing Sheets

SILICONE RUBBER VACUUM BAG TOOL

CROSS REFERENCE TO RELATED APPLICATION

This application is a continuation of application Ser. No. 655,656, filed 9-28-84 now U.S. Pat. No. 4,698,115.

TECHNICAL FIELD

The present invention relates to vacuum bag tools in general and in particular to silicone rubber vacuum bag tools and to a method of fabricating the bag for such a tool.

PRIOR ART

Vacuum bag tools for use in fabricating a structure made of composite material are known. See, for example, U.S. Pat. Nos: 3,146,148; 3,553,054; 3,575,756; 3,666,600; 3,769,133; 3,861,977; 4,065,340; 4,216,047; 4,287,015; and 4,357,193.

The vacuum bags disclosed are typically made of nylon, or a polymeric material or of rubber, such as silicone rubber. To effect an edge seal about the bag, a sealant such as zinc chromate is used. In some instances clamps are also used. I have had extensive experience as have others at the assignee company of the present invention with the tools using nylon bags adhered to the base plate of the tool with a sealant tape such as zinc chromate tape. It has been observed that the seal provided by the zinc chromate tape does not exhibit a high degree of effectiveness, i.e., leakages occur which result in lose of vacuum in the bag. This was observed even when C-clamps were added to the sealed edges of the bag. In a addition, the nylon bags lose considerable resiliency after a single use and must be discarded.

I have also had extensive experience as have others at the assignee company of the present invention with the tool disclosed in U.S. Pat. No. 4,287.015. The tool disclosed uses a rubber bag and triangular ribs extending about the bag at a position inward of the bag edge. Both the triangular ribs and the bag edge are sealed to the base plate of the tool by a sealant material. The seal is not established primarily at the junction of the bag with the base plate, but rather at the engagement of the bag and the triangular ribs. Leaks have been observed with this tool as well, due perhaps to the lack of adequate engagement of the bag and ribbing as well as the lack of adequate adherence of the sealant material to the bag. C-clamps were added to the bag edges at the base plate. Even so, leaks were detected resulting in lose of vacuum. The loss of vacuum in the bag is undesirable since control of the uniform pressure exerted by the bag on the layup in the bag is lost. Curing of the layup is thus adversely affected.

There is a need, therefore, for a vacuum bag which can be effectively sealed to hold a vacuum.

While the tool disclosed in U.S. Pat. No. 4,287,015 exhibits vacuum leak problems, it is still preferred over the tools using nylon bags because the rubber bag is reusable. However, the use of such a tool is undesirable because it requires considerable man-hours just in preparation time because of the ribbing.

There is a further need, therefore, for a tool which has a reusable bag and does not require an appreciable amount of man-hours of preparation.

SUMMARY OF THE INVENTION

The present invention was developed to overcome the noted problems. It was decided to eliminate the triangular ribs and to find more effective means of adhering the rubber bag to the base plate of the tool.

A silicone rubber bag was chosen since it has sufficient resiliency under repeated vacuum applications to insure a long service life. Attempts were made to find a way to adhere the widely used standard sealant tapes, such as zinc chromate tape, to the surface of the rubber bag. All attempts, however, failed. Apparently, silicone rubber does not adhere to the standard sealant tapes. It was found, however, that MOSITE #14206 adhesive could be made to adhere to the surface of the silicone rubber bag. The standard sealant tape could then be applied to the MOSITE adhesive for sealing the bag to the base plate of the tool.

BRIEF DESCRIPTION OF THE DRAWINGS

Three figures have been selected to illustrate a preferred embodiment of the invention. The figures are schematic in nature. They are, however, sufficiently detailed to enable the person skilled in the art to understand and practice the invention. Illustrated are.

DETAILED DESCRIPTION

Figure 1:
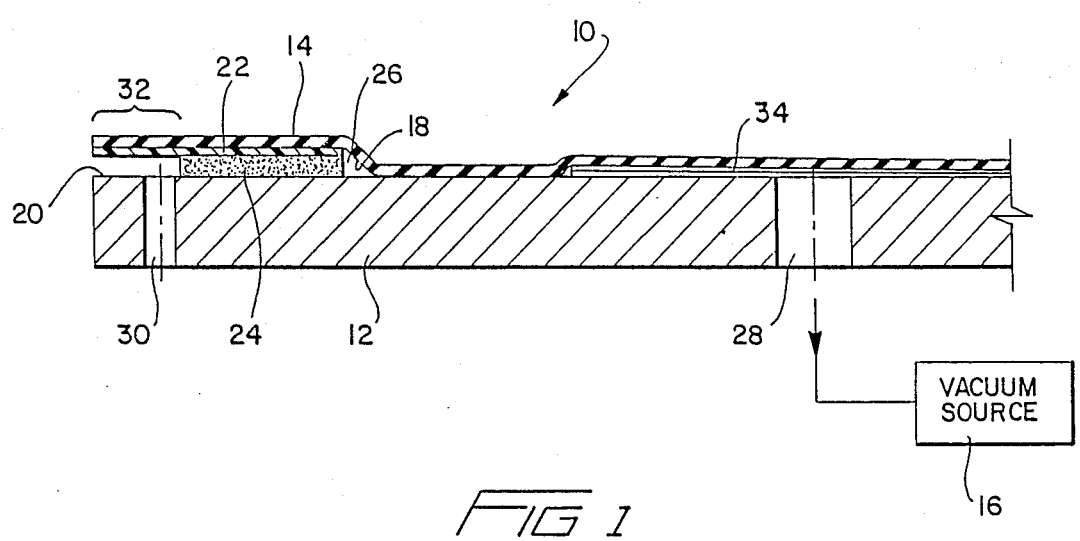
FIG. 1, which is a partial cross-sectional view of the tool according to the present invention.

A tool 10 according to a preferred embodiment of the present invention is shown in FIG. 1. The tool 10 includes a metal base plate 12, a silicone rubber bag 14 and a vacuum source 16. The bag 14 has four generally mutually perpendicular edges on the surface 18 on which facing the top surface 20 of the base plate 12, there is adhered a strip of silicone elastomer material 22. In conjunction with each strip of elastomer material 22 there is associated a strip of adhesive tape 24. Preferably the strips of adhesive tape 24 match the width of the corresponding strip of material 22, although they need not, as shown. The bag 14 is adhered to the top surface 20 of the base plate 12 by the adhesive strips 24 and is secured against the top surface 20 of the base plate 12 not only by the adhesive tape strips 24, but also by the pressure force applied by the external atmosphere when a vacuum is produced within the space 26 defined by the top surfaces 20 of the base plate 12 and the lower facing surface 18 of the bag 14.

The space 26 is evacuated by the vacuum source 16 through one or more ports 28 in the base plate 12. The connection to the port(s) 28 is conventional.

The base plate 12 is provided with bores 30 along its edges for use with clamps in clamping the overhanging edge 32 of the bag 14, if desired. The clamping procedure is also conventional.

The tool 10 is used in the curing process of a layup 34 of composite material. The layup is placed on the top surface 20 of the base plate 12 and rests in the space 26. A vacuum is produced in the space 26 by the vacuum source 16 with the bag 14 drawn down over the layup 34. In the process, the bag applies a pressure against the layup 34. The entire tool 10 is then placed in an autoclave in which the layup is finally cured through the application of further pressure and temperature.

The bag 14 of the tool 10 can be reused any number of times for subsequent curing operations by simply removing the strips of adhesive tape 24 and adhering new strips of adhesive tape 24 to the strips of silicone elastomer material 22.

It has been found that Mosite #14206 manufactured by the Mosite Rubber Company of Fort Worth, Tex. is a preferred silicone elastomer material 22. The Mosite Rubber Company has published the following physical properties of Mosite #14206

| | |
|---|---|
| Tensile (PSI) | 1000 |
| Hardness (Shore A) | 65 |
| Elongation % | 300 |
| Modulus at 100% Elongation (PSI) | 350 |
| Die C Tear | 120 |
| Sp. Gravity | 1.14 |

These physical properties listed above were obtained on molded ASTM test slabs. They are typical properties.

When using Mosite #14206, with the bag 14 of the tool 10, it was found that the bag 14 did not leak. The vacuum in space 26 was maintained so that the pressure on the layup 34 could be better controlled.

Figure 2:
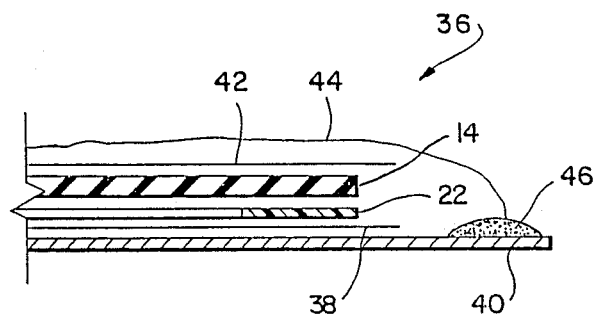
FIG. 2, which is a set-up for fabricating the bag of the tool of FIG. 1.
Figure 3:
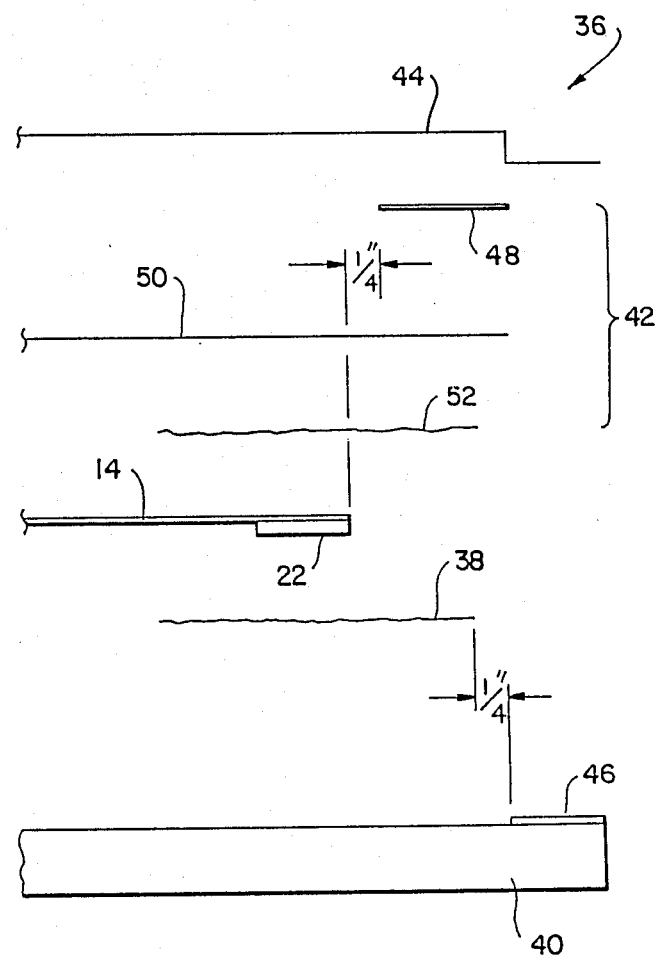
FIG. 3, which is an exploded view of the set-up of FIG. 2.

To apply the Mosite #14206 strips 22 to the bag 14, the set-up 36 shown in FIG. 2, and in more detail in FIG. 3 is used. A release film 38 of TEFLON is placed on the bag table 40. Next, the strips of Mosite #14206 are positioned on the release film 38, followed by the bag 14, a further release layer 42 and a nylon bag 44. The edge of the nylon bag 44 is adhered to the bag table 40 by a sealant tape 46 such as zinc chromate.

The bag table 40 should be at least 6 inches longer, both in length and width relative to the silicone rubber bag 14 to allow for bagging purposes. Referring to FIG. 3, the top surface of the bag table 40 is cleaned and a white TEFLON release film 38 is placed thereon around the periphery of the table 40 in the area where the Mosite adhesive is to be bonded to the bag 14. It should be approximately ¼ inch inwardly from the sealant tape 46. The outer edges of the bag 14 are solvent wiped with M.E.K. solvent and air dried for a minimum of ½ hour. Then the bag 14 is placed on the release film 38. Each edge of the bag 14 is then folded back and a strip of Mosite #14206 is applied to the surface of the bag 14 which will face the top surface of the table 40. Preferably, the Mosite strips are ½ inch wide and 1/32 inch thick. Preferably also, the corners of the Mosite strips are to be square cut with a ¼ inch minimum overlap. Next the material in place is wiped or rolled by hand to remove trapped air and the overlapped areas are faired in as smooth as possible. The release layer 42 is then applied. This layer comprises an air weave bleeder 48, a peel ply layer 50 and a TEFLON film layer 52. The air weave bleeder 48 is 2 inches wide and separated from the edge of the bag 14 by approximately ¼ inch. To complete the set-up 36, the nylon bag 44 is applied and adhered to the top surface of the table 40 by the sealant tape strips 46. The set-up 36 is then leak checked and if acceptable placed in an autoclave for curing. Curing takes place at 60±5 PSI pressure and 305°–350° F. for 35±5 minutes. As a result of this curing, the strips 22 of Mosite #14206 are securely adhered to the bag 14. The bag 14 with the strips 22 of Mosite #14206 is removed for use in the tool 10 for the purpose noted above. For this purpose, the strips 24 of adhesive tape are applied to the Mosite strips. If the bag is to be stored or shipped, a release layer with a non-adhesive outer surface can be applied to the tape strips 24.

What is claimed is:

1. A tool for use in applying pressure to a layup of composite material, comprising:

a base plate;

a silicone rubber bag in the form of a sheet having at least one edge, said at least one edge having on the surface of said sheet facing the base plate a strip of silicone elastomer material adhered thereto and a further strip of adhesive tape adhered to the strip of silicone elastomer material, said strip of adhesive tape adhering the at least one edge of the sheet to the base plate; and means for establishing a vacuum within the bag when adhered to the base plate.

2. The tool as defined in claim 1, wherein the silicone elastomer material includes the following physical properties:

| | |
|---|---|
| Tensile (PSI) | 1000 |
| Hardness (Shore A) | 65 |
| Elongation % | 300 |
| Modulus at 100% Elongation (PSI) | 350 |
| Die C Tear | 120 |
| Sp. Gravity | 1.14 |

* * * * *